United States Patent [19]

Zirngibl

[11] Patent Number: 5,550,666

[45] Date of Patent: Aug. 27, 1996

[54] WAVELENGTH DIVISION MULTIPLEXED MULTI-FREQUENCY OPTICAL SOURCE AND BROADBAND INCOHERENT OPTICAL SOURCE

[75] Inventor: Martin Zirngibl, Middletown, N.J.

[73] Assignee: Lucent Technologies Inc., Murray Hill, N.J.

[21] Appl. No.: 261,584

[22] Filed: Jun. 17, 1994

[51] Int. Cl.$^6$ ........................................ H04J 14/02
[52] U.S. Cl. .................. 359/125; 359/124; 359/130; 359/133; 372/6; 385/15
[58] Field of Search ..................... 372/6, 37; 385/16, 385/17, 37, 15; 359/124, 125, 180, 133, 130, 137

[56] References Cited

U.S. PATENT DOCUMENTS

| | | | |
|---|---|---|---|
| 4,773,063 | 9/1988 | Hunsperger et al. | 359/130 |
| 5,221,983 | 6/1993 | Wagner | 359/125 |
| 5,237,576 | 8/1993 | DiGiovanni et al. | 385/37 |
| 5,311,344 | 5/1994 | Bohn et al. | 359/137 |
| 5,373,517 | 12/1994 | Dragone et al. | 372/6 |

OTHER PUBLICATIONS

Cheng et al, "Subscriber Loop Architecture", *AT&T Technical Digest*, No. 75, Sep. 1984, pp. 9–10.

"Multichannel Optical Network Using Optical Subcarrier Multiplexing", *IBM Technical Bulletin*, vol. 33, No. 9, Feb. 1991, pp. 218–221.

Glance et al, "Discretely Tuned N–Frequency Laser for Packet Switching", *Electronics Letters*, vol. 27, No. 15, pp. 1381–1383.

Dragone C., Edwards, C. A., Kistler, R. C., "Integrated Optics N×N Multiplexer on Silicon, " IEEE Photonics Technology Letters, vol. 3, No. 10, Oct. 1991, pp. 896–899.

Frigo, N. J., Magill, P. D., Darcie, T. E., Iannone, P. P., Downs, M. M., Desai, B. N., Koren, U., Koch, T. L., Dragone, C., Presby, H. M., "RITE–Net: A Passive Optical Network Architecture Based on the Remote Interrogation of Terminal Equipment," Optical Fiber Communication Technical Digest, Feb. 20–25, 1994, San Jose, CA, pp. 43–45.

Zirngibl, M., Joyner, C. H., "A High Performance, 12 Wavelength Optical Multi–Channel Controller," Integrated Photonics Research, Feb. 17–19, 1994, San Francisco, CA.

Zirngibl, M., Joyner, C. H., "A 12–Frequency WDM Laser Source Based on a Transmissive Waveguide Grating Router," Optical Fiber Communication Technical Digest, Feb. 20–25, 1994, San Jose, CA, pp. 75–78.

*Primary Examiner*—Leo Boudreau
*Assistant Examiner*—Bhavesh Mehta

[57] ABSTRACT

A wavelength division multiplexing multi-frequency optical source is used to provide downstream transmission of information signals at discrete optical wavelengths from a central office to a plurality of optical network units. A passive optical demultiplexer in a remote node routes the downstream information signals to the optical networks according to optical wavelength. Broadband incoherent sources are used to provide upstream information signals at discrete optical wavelengths which are multiplexed and then routed to the central office for demultiplexing by the passive optical demultiplexer. A wavelength selective coupler in the central office and in each optical network unit combines and segregates downstream and upstream signals of different optical wavelengths for routing to a desired destination.

46 Claims, 3 Drawing Sheets

WAVELENGTH DIVISION MULTIPLEXED MULTI-FREQUENCY OPTICAL SOURCE AND BROADBAND INCOHERENT OPTICAL SOURCE

FIELD OF THE INVENTION

This invention relates generally to optical fiber communication. More particularly, the present invention relates to the utilization of a wavelength division multiplexed multi-frequency optical source and a broadband incoherent optical source for transmitting information signals via optical fibers.

BACKGROUND OF THE INVENTION

Communication of information signals on a point-to-point basis in an optical fiber network is most practically achieved by impressing information signals on optical carriers and routing these optical information signals to the desired destination on the basis of optical wavelength, a technique known as wavelength division multiplexing. In a wavelength division multiplexed optical network, optical information signals are transmitted via optical fibers between a central office and a plurality of optical network units at a plurality of discrete optical wavelengths. Each optical network unit receives and transmits an optical information signal at a specific, predetermined optical wavelength. A remote node interposed between the central office and the plurality of optical network units routes the optical information signals between each of the optical network units and the central office according to optical wavelength.

Presently, wavelength division multiplexed optical networks, such as the RITE-Net, described in N. J. Frigo et al., "RITE-Net: A Passive Optical Network Architecture Based on the Remote Interrogation of Terminal Equipment," OFC '94 Postdeadline papers, pp. PD8-1 to PD8-3 (1994), and incorporated by reference herein, utilize a plurality of discretely tunable optical sources, such as lasers, to send information signals, known as downstream information or downstream traffic, from the central office to the optical network units. Optical information signals at a plurality of discrete wavelengths are obtained by tuning the laser, in succession, to a discrete wavelength and then modulating the optical power emitted by the laser using techniques well known in the art. For the transmission of optical information signals from the plurality of optical network units to the central office, known as upstream information or upstream traffic, a modulator in each optical network unit imprints an information signal on a continuous wave portion of the downstream signal that was routed to the optical network unit over a first optical fiber. Each upstream signal is coupled from the optical network unit into a second optical fiber for routing through the remote node to the central office.

There exists, however, a need for a more economical and efficient wavelength division multiplexing network architecture. A tunable laser may emit only one optical wavelength at a time, a well known characteristic of time division multiplexing (TDM), and, therefore, inefficiently utilizes the time dimension of a transmission path. In addition, the optical receiver of an optical network unit must operate at the full aggregate bit-rate. Further, two optical fibers are required for connecting each optical network unit to the remote node. Finally, the use of modulators in optical network units is not yet economical.

SUMMARY OF THE INVENTION

In accordance with the present invention, a wavelength division multiplexed multi-frequency optical source and a broadband incoherent optical source are utilized in an optical fiber network to facilitate the transmission of a plurality of information signals at specific optical wavelengths.

In one embodiment, the invention comprises a wavelength division multiplexing multi-frequency optical source in a central office and a plurality of broadband incoherent optical sources, respectively, in a plurality of optical network units. A passive optical demultiplexer in a remote node serves to interconnect the optical network units and the central office. The multi-frequency source provides a plurality of multiplexed discrete optical wavelength carriers. Information signals are impressed upon these optical carriers by modulating the multi-frequency source, using either direct or external modulation techniques, to create a plurality of discrete optical information signals for downstream transmission. A wavelength selective coupler in the central office routes the plurality of multiplexed optical information signals to the remote node, where the passive optical demultiplexer demultiplexes the multiplexed downstream optical information signals according to optical wavelength. The demultiplexed optical information signals are routed from the passive optical demultiplexer to the plurality of optical network units according to optical wavelength.

For upstream transmission, the plurality of broadband sources provides a plurality of discrete optical wavelength carriers upon which, respectively, a plurality of information signals is impressed to create a plurality of optical information signals. The passive optical demultiplexer spectrally slices and multiplexes the plurality of upstream optical information signals. The wavelength selective coupler routes the multiplexed upstream signals from the remote node to a receiver in the central office. The receiver segregates the multiplexed signals into distinct information signals for further processing.

In a preferred embodiment of this invention, the downstream and upstream signals are provided, respectively, at optical wavelengths of around 1.5 μm and 1.3 μm. The transmission of optical information signals at these wavelengths allows the upstream and downstream signals to be combined and separated loss-free by the wavelength selective coupler in the central office. The upstream optical information signals are demultiplexed at the central office by using either TDM or subcarrier multiplexing (SCM), as is well known in the art, depending upon whether the information signals have been impressed upon the upstream optical carriers using, respectively, TDM or SCM.

In a further embodiment of this invention, both the upstream and downstream optical information signals are provided by direct or external modulation of the multi-frequency source and the broadband source. A wavelength division demultiplexing receiver is used as the receiver in the central office for optically demultiplexing the upstream information signals. Alternatively, the multi-frequency source in the central office may be operated to optically demultiplex the upstream information signals.

The many advantages of the present invention will be readily apparent from the detailed description and the drawings that follow.

DETAILED DESCRIPTION

Figure 1:
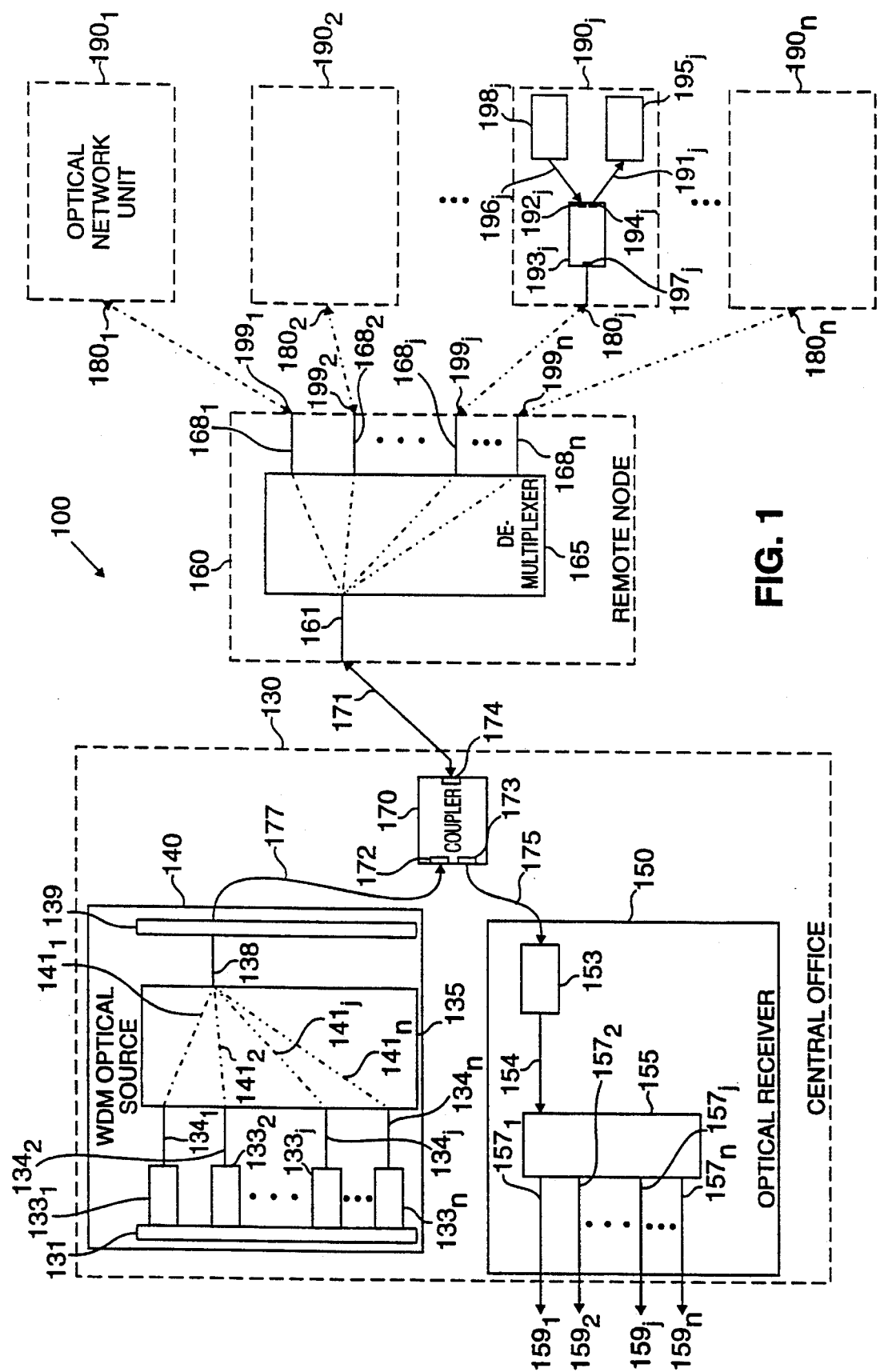
FIG. 1 shows a block diagram of a wavelength division multiplexed optical fiber network which uses SCM or TDM for upstream transmission of information signals.
Figure 2:
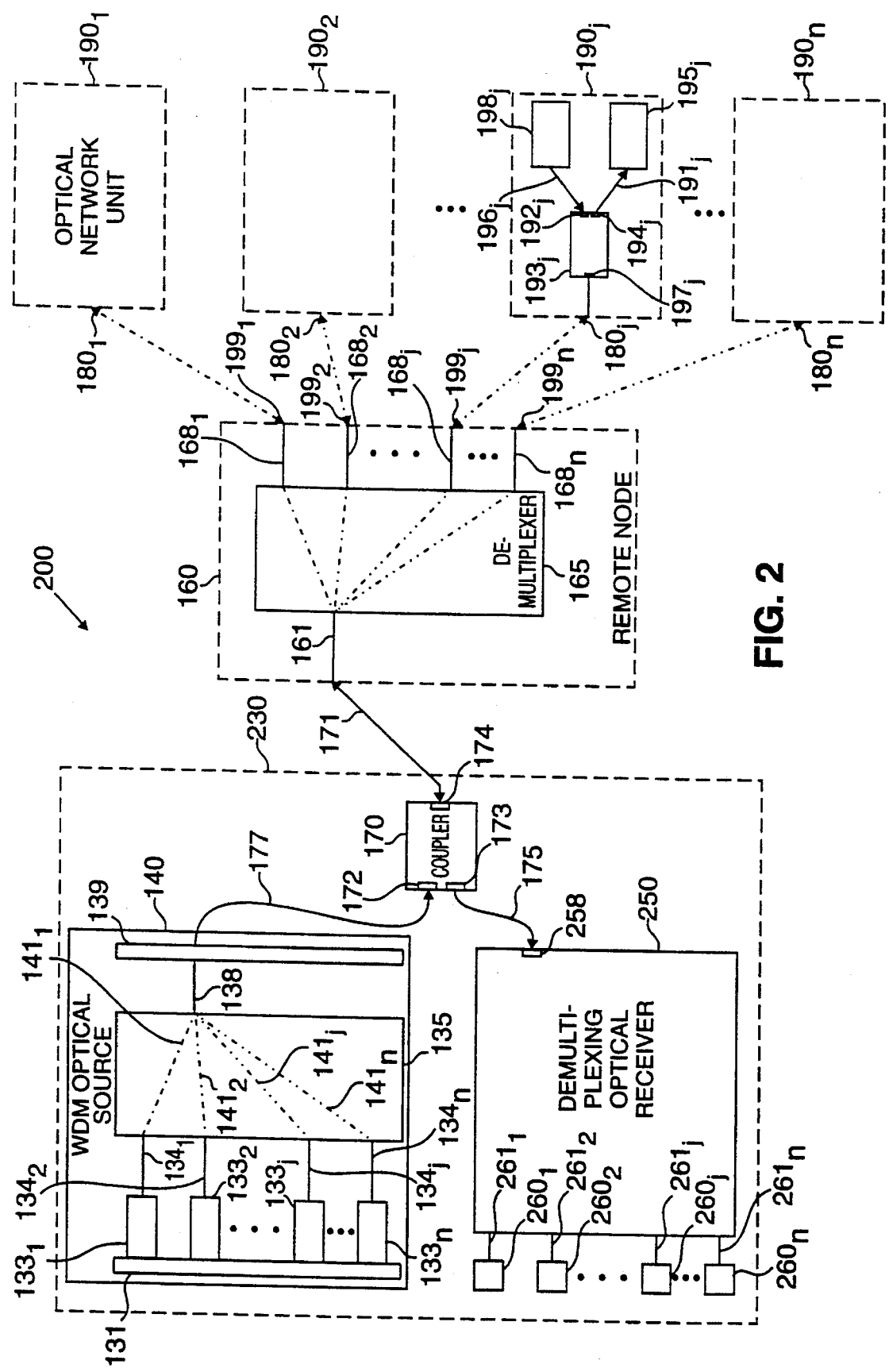
FIG. 2 shows a block diagram of a wavelength division multiplexed optical fiber network which has a wavelength division multiplexing optical source and a wavelength division demultiplexing optical receiver in the central office.
Figure 3:
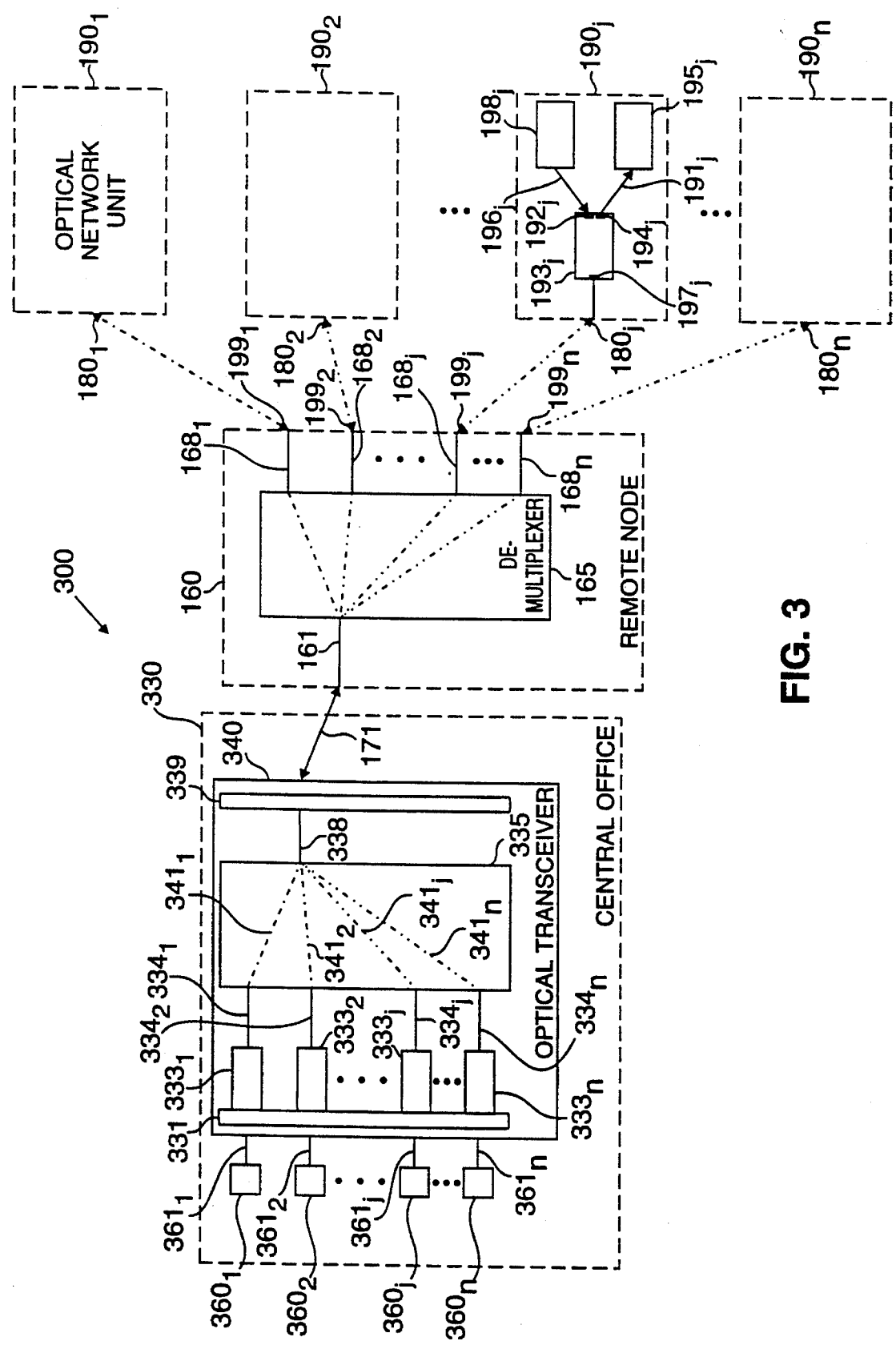
FIG. 3 shows a block diagram of a wavelength division multiplexed optical fiber network which has a wavelength division multiplexing optical source in the central office that also operates as a wavelength division demultiplexing optical receiver.

An optical fiber wavelength division multiplexed local access routing network (LARNET) according to the present invention is illustrated in FIGS. 1, 2 and 3. As will be more fully described below, each of the FIGS. 1, 2 and 3 illustrates a different embodiment of a LARNET that comprises substantially the same components and operates in a similar fashion.

FIG. 1 shows a LARNET 100 comprising a central office or CO 130, a remote node or RN 160, and a plurality of optical network units (ONUs) ONU $190_1$, ONU $190_2$, ... ONU $190_n$ or ONUs $190_{1-n}$. In the description below, a plurality of elements $I_1, I_2, \ldots I_n$ will be referred to as $I_{1-n}$. The CO 130 comprises a wavelength division multiplexing multi-frequency optical source 140, a receiver 150 and a wavelength selective coupler 170, all of which may suitably be integrated on a semiconductor chip. As explained below, the multi-frequency source 140 is capable of generating, simultaneously, a plurality of optical information signals for coupling into a single optical fiber. The receiver 150 may be either a subcarrier demultiplexing or a time division demultiplexing receiver.

The RN 160 comprises a passive optical demultiplexer 165, the details of construction and operation of which are described more fully in C. Dragone et al., "Integrated Optics N×N Multiplexer on Silicon", IEEE Photon. Technol. Lett., vol. 3, no. 10, pp. 896–99 (1991), and incorporated by reference herein. The optical demultiplexer 165 is, preferably, a waveguide grating router. The passive optical demultiplexer 165, embodied as a waveguide grating router, comprises a transmission port 161 and a plurality of routing ports $168_{1-n}$ which, preferably, correspond on a one-to-one basis with the number of ONUs $190_{1-n}$. The optical demultiplexer 165 may be manufactured on any number of semiconductor materials and, preferably, is fabricated on silicon dioxide ($SiO_2$) to minimize the power losses experienced by an optical wavelength carrier propagating in the LARNET 100. A plurality of optical fibers $180_{1-n}$, respectively, couple the plurality of routing ports $168_{1-n}$ to the respective plurality of ONUs $190_{1-n}$.

The wavelength selective coupler 170 comprises an input port 172, an output port 173 and a bidirectional port 174. An optical fiber 171 couples the bidirectional port 174 to the transmission port 161 of the optical demultiplexer 165, an optical fiber 175 couples output port 173 to the receiver 150 and an optical fiber 177 couples input port 172 to the multi-frequency source 140.

Henceforth in this description, reference to and description of the element $X_j$ of a group of $X_{1-n}$ elements will be exemplary of the structure and functionality of similar elements $X_j$ in the group of $X_{1-n}$ elements. It is to be understood that all the elements of a group of elements $X_{1-n}$, preferably, are similar in structure and function. One element of a group of elements, however, may differ from another for purposes of this invention. For example, the ONU $190_j$ preferably is exemplary of all other ONUs, in other words, ONU $190_1$, ONU $190_2$, ... ONU $190_n$. The ONU $190_1$, however, need not be identical to the ONU $190_2$, or other ONUs, for purposes of this invention.

The ONU $190_j$ in the LARNET 100 preferably comprises a wavelength selective coupler $193_j$, a broadband incoherent optical source $198_j$ and a downstream optical receiver $195_j$. The coupler $193_j$ is preferably similar in structure and function to the wavelength selective coupler 170, and comprises an input port $192_j$, an output port $194_j$ and a bidirectional port $197_j$.

The plurality of optical fibers $180_{1-n}$, respectively, couple the routing ports $168_{1-n}$ of the optical demultiplexer 165 to the bidirectional ports $197_{1-n}$ of the couplers $193_{1-n}$. For the optical network unit $190_j$, an optical fiber $196_j$ couples the input port $192_j$ of the coupler $193_j$ to the broadband source $198_j$, and an optical fiber $191_j$ couples the output port $194_j$ of the coupler $193_j$ to the optical receiver $195_j$. The wavelength coupler $193_j$, the broadband source $198_j$, the downstream receiver $195_j$, and the associated interconnecting fibers $196_j$ and $191_j$ all may be integrated, preferably, on a semiconductor chip which is fabricated on indium phosphate (InP).

The broadband source $198_j$ may suitably be any optical source that has a flat emission spectrum over at least one free spectral range of the optical demultiplexer 165 in the RN 160, and that provides an output power which is sufficient for transmission at the upstream data rate. For instance, the broadband source $198_1$ may be selected to provide an optical signal at a wavelength of approximately 1.3 μm, whereas the broadband source $198_2$ may be selected to provide an optical carrier at a wavelength of approximately 1.5 μm. Preferably, the broadband source $198_j$ is a light emitting diode (LED) because the LED is commercially available at a low cost and has been proven reliable over time by extensive use in data links in optical networks.

A summary of how optical information signals are distributed in the LARNET 100 is provided at this point, with a more detailed description of the structure and functionality of the specific components of the LARNET 100 provided below. The description of optical signal distribution in the LARNET 100 also, in many respects, applies identically for the LARNET embodiments shown in FIGS. 2 and 3, as will be seen below. For purposes of describing this invention, the output of an optical source, such as the multi-frequency source 140 or the broadband source $198_j$, is referred to in terms of the emitted optical wavelength.

In the LARNET 100, a plurality of optical information signals $141_{1-n}$ destined for the RN 160 and the plurality of ONUs $190_{1-n}$ it serves are created at the multi-frequency source 140 by the modulation of a plurality of discrete optical wavelength carriers $\lambda 141_{1-n}$ which are produced at multi-frequency source 140. The optical information signals $141_{1-n}$ are multiplexed in multi-frequency source 140 and then coupled into the optical fiber 177 for downstream transmission to the RN 160. The downstream signals $141_{1-n}$ leave the optical fiber 177 and enter the coupler 170 at input port 172. They then proceed to propagate through the coupler 170 to the bidirectional port 174. Fiber 171 routes the signals $141_{1-n}$ from the bidirectional port 174 to transmission port 161 of the optical demultiplexer 165.

The optical demultiplexer 165 spectrally demultiplexes the multiplexed optical signals $141_{1-n}$ according to optical wavelength. The ONU $190_j$ receives from the RN 160 via the fiber $180_j$ an optical information signal $141_j$ at the discrete optical wavelength of optical carrier $\lambda 141_j$. The optical wavelength of the demultiplexed optical information signal $141_j$ received at the ONU $190_j$ is the same as that of the discrete optical wavelength carrier $\lambda 141_j$ of the optical information signal $141_j$ which was provided at the multi-frequency source 140 and intended to be transmitted to that specific ONU $190_j$. Spectral alignment among the plurality of discrete optical information signals $141_{1-n}$ transmitted downstream is thus achieved.

For upstream traffic, a plurality of optical information signals $199_{1-n}$ is transmitted, respectively, from the plurality of ONUs $190_{1-n}$ to the RN 160. The ONU $190_j$ provides either a subcarrier or time division multiplexed optical information signal $199_j$ which is coupled to the optical fiber $180_j$ for routing to the routing port $168_j$ of the RN 160. The optical demultiplexer 165 optically slices and multiplexes the upstream optical signals $199_{1-n}$. They then propagate upstream from the transmission port 161 of the optical demultiplexer 165 to the bidirectional port 174 of the coupler 170 via the fiber 171. The upstream traffic continues to propagate through the coupler 170 to output 173. The optical fiber 175 couples the upstream traffic at output 173 of the coupler 170 for routing to the receiver 150 of the CO 130. The receiver 150 receives the upstream traffic and performs subcarrier or time division demultiplexing to provide a plurality of distinct information signals $159_{1-n}$ which correspond, respectively, to the plurality of optical information signals $199_{1-n}$ transmitted by the plurality of ONUS $190_{1-n}$.

The multi-frequency source 140 may be any component which suitably provides a source of a plurality of multiplexed discrete optical wavelength carriers, preferably at approximately 1.5 μm, upon which information signals may be impressed. Preferably, a waveguide grating router multi-frequency laser (WGR laser), whose construction and operation is more fully described in detail in M. Zirngibl and C. H. Joyner, "A 12-Frequency WDM Source Laser Based on a Transmissive Waveguide Grating Router," OFC '94 Post-deadline papers, pp. PD16-1 to PD16-4 (1994), and incorporated by reference herein, is used as the multi-frequency source 140 in the LARNET 100.

The multi-frequency source 140, embodied as a WGR laser, comprises a plurality of optical amplifiers $133_{1-n}$ and associated waveguides $134_{1-n}$, a completely transmissive n×1 waveguide grating router 135, where n is defined as the number of optical amplifiers and associated waveguides, and an output port 138, all defined between a pair of mirror facets 131 and 139. In principle, any number of optical amplifiers and associated waveguides may be implemented as long as the physical size of the multi-frequency source 140 remains practical for purposes of fabrication. For example, the number n of optical amplifiers and associated waveguides may be equal to 12, such that a 12×1 router 135 is utilized in the LARNET 100.

When properly biased, an optical amplifier $133_j$ in combination with the associated waveguide $134_j$ and the router 135 defines a specific optical transmission route that supports propagation of light only at the wavelength of the optical carrier $\lambda 141_j$ which is within the optical gain bandwidth of the route. For example, an optical information signal $141_1$ at the wavelength of optical carrier $\lambda 141_1$ is produced at output 138 for downstream transmission to the ONU $190_1$ by modulation of the drive current applied to the optical amplifier $133_1$ of multi-frequency source 140. An information signal is impressed upon the optical carrier $\lambda 141_1$ to form optical information signal $141_1$ by use of known techniques, such as amplitude or intensity modulation with either analog or digital signals. Modulation of the plurality of optical amplifiers $133_{1-n}$ of multi-frequency source 140, similarly, produces a plurality of discrete information signals $141_{1-n}$ at the respective wavelengths of optical carriers $\lambda 141_{1-n}$. The multi-frequency source 140, therefore, may support the propagation of a plurality of discrete optical carriers $\lambda 141_{1-n}$. It has been experimentally shown that an optical carrier $\lambda 141_j$ produced by the multi-frequency source 140 may be modulated at a rate of at least 155 megabits per sec (Mb/sec).

The spectral characteristics of the optical transmission routes of a multi-frequency optical source 140 may be designed to produce optical signals $141_{1-n}$ at the respective wavelengths of the optical carriers $\lambda 141_{1-n}$ that are separated from each other by the wavelength interval $\Delta\lambda$. The advantage of utilizing a wavelength division multiplexed multi-frequency optical source 140 is that the physical properties inherent to the router 135 ensure that information signals in an optical fiber network are transmitted downstream only at the plurality of specific, predetermined optical wavelengths of the optical carriers $\lambda 141_{1-n}$. In other words, the optical carrier $\lambda 141_j$ upon which an information signal is impressed to produce an optical information signal $141_j$ is automatically spaced over M intervals $\Delta\lambda$ and does not drift or shift over time, where M is, preferably, equal to twelve.

The router 135 in combination with the optical amplifiers $133_{1-n}$ and their associated waveguides $134_{1-n}$ serves to multiplex the plurality of discrete optical information signals $141_{1-n}$ in the manner described in M. Zirngibl and C. H. Joyner, "A High Performance, 12 Wavelength Optical Multi-Channel Controller," Integrated Photonics Research Post-deadline papers, pp. PD2-1 to PD2-4 (1994), and incorporated by reference herein. The multiplexed optical information signals $141_{1-n}$ are coupled from output 138 of the multi-frequency source 140 into the optical fiber 177 for downstream transmission. An optical amplifier, not shown, may be inserted at output port 138 to increase the power level of the multiplexed optical information signals $141_{1-n}$ prior to downstream transmission.

The wavelength selective coupler 170 routes the downstream and upstream traffic transmitted between the CO 130 and the RN 160. The upstream traffic typically is provided at optical wavelengths in a different optical band than the downstream traffic. The wavelength selective coupler 170 combines the downstream traffic provided by the multi-frequency source 140 and the upstream traffic routed from the RN 160, and separates these optical information signals according to optical wavelength for further downstream transmission to the ONUs $190_{1-n}$ and upstream transmission to the receiver 150.

The optical demultiplexer 165 of the RN 160 receives at the transmission port 161 the multiplexed downstream optical information signals $141_{1-n}$ which have been coupled from the bidirectional port 174 of the coupler 170 into the optical fiber 171. The optical demultiplexer 165 demultiplexes these multiplexed optical signals $141_{1-n}$ and routes them to the plurality of ONUs $190_{1-n}$ according to optical wavelength. For instance, the demultiplexed optical information signal $141_j$ is routed to the routing port $168_j$. The routing port $168_j$ is coupled to one end of the optical fiber $180_j$, with the other end of the optical fiber $180_j$ coupled to the ONU $190_j$. The optical wavelength of the optical carrier $\lambda 141_j$ of the downstream signal $141_j$ is used for routing the signal $141_j$ to the desired ONU $190_j$. As a result, the discrete optical information signal $141_j$ produced at the multi-frequency source 140 is received by only one individual ONU $190_j$.

The spectral characteristics of the optical demultiplexer 165 in the RN 160 must be matched to those of the router 135 of the multi-frequency source 140 to achieve alignment of downstream traffic. For instance, in the LARNET 100, where router 135 has twelve optical transmission routes that provide information signals at twelve discrete optical wavelengths, optical demultiplexer 165 must have at least twelve identical optical transmission routes as well as at least twelve associated routing ports.

The downstream information signal $141_j$, at the specific optical wavelength of the optical carrier $\lambda 141_j$, as routed at the RN 160, is received from the routing port $168_j$ of the optical demultiplexer 165 at the bidirectional port $197_j$ of the coupler $193_j$ via the optical fiber $180_j$. The signal $141_j$ then propagates through the coupler $193_j$ to output port $194_j$ of the coupler $193_j$, where it is coupled into the fiber $191_j$ for transmission to the optical receiver $195_j$. The optical receiver $195_j$ detects and demodulates the optical information signal $141_j$ using conventional techniques and components, not shown, as is known in the art.

For upstream traffic, the plurality of broadband sources $198_{1-n}$ provide a plurality of optical carriers $\lambda 199_{1-n}$ upon which, respectively, a plurality of information signals are impressed to create the plurality of upstream optical information signals $199_{1-n}$. A broadband source 198, preferably, provides the upstream information signal $199_j$ over a large optical wavelength band at approximately 1.3 μm. The optical information signal $199_j$ is coupled from the broadband source $198_j$ into the input port $192_j$ of the coupler $193_j$ via the optical fiber $196_j$ for upstream transmission. The information signal may be subcarrier or time division multiplexed on the discrete optical carrier $\lambda 199_j$ emitted by the broadband source $198_j$ by conventional techniques and components, not shown, that are well known in the art.

The RN 160 receives the upstream signals $199_{1-n}$ at the routing ports $168_{1-n}$ of the optical demultiplexer 165. The upstream signal $199_j$ propagates through the coupler $193_j$ from the input port $192_j$ to the bidirectional port $197_j$, and then is coupled from the bidirectional port $197_j$ into the fiber $180_j$ for upstream transmission to the routing port $168_j$. According to well known principles, the optical demultiplexer 165 multiplexes these optical information signals $199_{1-n}$ and makes them available for coupling to the optical fiber 171 at the transmission port 161 of the optical demultiplexer 165.

The full spectral output of the broadband source $198_j$, however, is not transmitted upstream to the CO 130. The transmission bandwidth of an optical transmission path of the optical demultiplexer 165 filters the upstream information signal $199_j$. The optical demultiplexer 165 in the RN 160 permits only a relatively narrow spectral slice of the upstream information signal $199_j$ to be coupled from the transmission port 161 of the optical demultiplexer 165 for further upstream transmission to the receiver 150. Only that portion of the upstream information signal $199_j$ that is centered about the peak optical wavelength of the optical carrier $\lambda 199_j$ provided by the broadband source $198_j$ is transmitted further upstream from the optical demultiplexer 165.

The RN 160 in the LARNET 100 thus serves as an optical filter and a through-port for physically routing upstream traffic to the receiver 150. Since the upstream traffic provided from the plurality of ONUs $190_{1-n}$ is sliced by the optical demultiplexer 165 in the RN 160 at the plurality of discrete wavelengths of the respective plurality of the optical carriers $\lambda 199_{1-n}$, optical beat interference is not a problem.

The RN 160 connects the ONU $190_j$ to the routing port $168_j$, preventing spectral overlap between an upstream signal of the optical wavelength of the optical carrier $\lambda 199_j$ and other upstream signals, such as a signal of the optical wavelength of the optical carrier $\lambda 199_{j+1}$ or a signal of the optical wavelength of the optical carrier $\lambda 199_{j-1}$. Further, upstream routing through the optical demultiplexer 165 minimizes the number of optical fiber network components required for both downstream and upstream traffic routing in the LARNET 100.

An isolator, not shown, may be inserted between output port 138 of the CO 130 and input port 172 of the coupler 170 to prevent feedback from upstream traffic which may otherwise be reflected into the multi-frequency source 140.

The receiver 150 comprises a broadband photoreceiver 153 and a demultiplexer 155. The demultiplexer 155 may be either a subcarrier or time division demultiplexer. From the RN 160, the multiplexed optical information signals $199_{1-n}$ are coupled from transmission port 161 to the bidirectional port 174 of the coupler 170 via fiber 171. The upstream traffic continues to propagate through the coupler 170 to output port 173 for further transmission to the photoreceiver 153 via the optical fiber 175. The output of photoreceiver 153 is coupled to the demultiplexer 155 via a coaxial cable 154. The demultiplexer 155 subcarrier or time division demultiplexes the upstream information signals and provides, on a plurality of communication channels $157_{1-n}$, the plurality of electrical output signals $159_{1-n}$ which correspond, respectively, to the optical information signals $199_{1-n}$ transmitted by the plurality of ONUs $190_{1-n}$.

FIG. 2 shows a LARNET 200, and FIG. 3 shows a LARNET 300. The LARNET 200 and the LARNET 300, in many respects, are substantially functionally and structurally identical to the LARNET 100. Those components in the LARNET 200 and the LARNET 300 which are preferably structurally identical to the components in the LARNET 100 are referenced in FIG. 2 and FIG. 3 using the same reference numerals utilized in FIG. 1. Reference should be made to the description of the LARNET 100 above for a detailed explanation concerning the structure and operation of components in the LARNET 200 and the LARNET 300 which are identical to those used in the LARNET 100.

In the LARNET 200, direct or external intensity modulation of a multi-frequency source 140 and a plurality of broadband sources $198_{1-n}$ is utilized for the transmission of information signals downstream and upstream, respectively. The LARNET 200 comprises a central office or CO 230, an RN 160 and a plurality of ONUs $190_{1-n}$. The CO 230 comprises a multi-frequency source 140, a wavelength division demultiplexing optical receiver 250, a wavelength selective optical coupler 170 and a plurality of optical receivers $260_{1-n}$, all of which may suitably be integrated on a semiconductor chip. A plurality of optical fibers $261_{1-n}$, respectively, connect the plurality of optical receivers $260_{1-n}$ to the demultiplexing optical receiver 250. The optical fibers connecting the coupler 170 to the RN 160, the multi-frequency source 140 and the demultiplexing optical receiver 250 in the LARNET 200 are connected as in the LARNET 100, except that the demultiplexing optical receiver 250 in the LARNET 200 is substituted for the receiver 150 of the LARNET 100.

The multi-frequency source 140 provides a multiplexed plurality of discrete downstream optical information signals $141_{1-n}$ for transmission to the respective ONUs $190_{1-n}$ as routed through the RN 160.

For upstream traffic, the plurality of broadband sources $198_{1-n}$ in the plurality of ONUs $190_{1-n}$ provide a plurality of optical wavelength carriers $\lambda 199_{1-n}$. A plurality of upstream information signals are impressed upon the plurality of optical carriers $\lambda 199_{1-n}$, respectively, to create a plurality of upstream optical information signals $199_{1-n}$ by intensity modulating the drive currents applied to the broadband sources $198_{1-n}$ using conventional techniques.

The optical demultiplexer 165 multiplexes the plurality of optical information signals $199_{1-n}$ transmitted upstream via optical fibers $180_{1-n}$, and routes the multiplexed signals from transmission port 161 of the optical demultiplexer 165 to the demultiplexing optical receiver 250 via the coupler 170. The multiplexed upstream information signals $199_{1-n}$ then propagate to an input port 258 of the demultiplexing optical receiver 250 via the fiber 175.

The demultiplexing optical receiver 250 wavelength demultiplexes the optical information signals $199_{1-n}$ which are routed upstream by the coupler 170. Typically, the demultiplexing optical receiver 250 is an optical 1×N demultiplexer that is capable of demultiplexing N discrete optical carriers. For example, the demultiplexing optical receiver 250 may suitably comprise a 1×12 demultiplexer. The plurality of demultiplexed optical carriers $\lambda 199_{1-n}$ are coupled into the plurality of optical fibers $261_{1-n}$, respectively, for transmission to the plurality of optical receivers $260_{1-n}$, which convert the plurality of discrete optical information signals $199_{1-n}$ into a plurality of respective discrete electrical signals. The physical characteristics of the optical demultiplexer 165 in combination with the demultiplexing optical receiver 250 are thus exploited to achieve demultiplexing of optical signals according to optical wavelength.

FIG. 3 shows the LARNET 300, which is an alternative embodiment of the LARNET 200. As in the LARNET 200, direct or external intensity modulation of a multi-frequency source 140 and a plurality of broadband sources $198_{1-n}$ is utilized in LARNET 300 for the transmission of information signals downstream and upstream, respectively.

The LARNET 300 comprises a central office or CO 330, a RN 160 and a plurality of ONUs $190_{1-n}$. The CO 330 further comprises a wavelength division optical transceiver 340 and a plurality of electrical receivers $360_{1-n}$, both of which may suitably be integrated on a semiconductor chip. The optical transceiver 340 operates both as a wavelength division multiplexing multi-frequency optical source and a wavelength division demultiplexing optical receiver, and suitably comprises a WGR laser which is preferably identical in structure to the multi-frequency source 140. The optical transceiver 340, embodied as a WGR laser, comprises a plurality of optical amplifiers $333_{1-n}$ and their associated waveguides $334_{1-n}$, a router 335 and a transceiving port 338, all defined between mirror facets 331 and 339. A plurality of electrical lines $361_{1-n}$ is connected, respectively, to the plurality of optical amplifiers $333_{1-n}$ and the plurality of electrical receivers $360_{1-n}$. An optical fiber 171 couples the transceiving port 338 to the transmission port 161 of the optical demultiplexer 165. The plurality of routing ports $168_{1-n}$ of the RN 160 is, respectively, coupled to the plurality of ONUs $190_{1-n}$ via a plurality of optical fibers $180_{1-n}$.

For downstream transmission of optical information signals, optical transceiver 340 is operated in the same manner as multi-frequency source 140 in the LARNET 100 and the LARNET 200. The optical transceiver 340 produces a multiplexed plurality of discrete optical information signals $341_{1-n}$. These multiplexed signals $341_{1-n}$ are coupled into the optical fiber 171 at transceiving port 338 for downstream transmission to the RN 160. As was the case in the LARNET 100 and the LARNET 200, RN 160 demultiplexes the downstream optical information signals $341_{1-n}$ and then routes them individually to the appropriate ONU $190_j$. The plurality of ONUs $190_{1-n}$ receive, respectively, the plurality of demultiplexed downstream information signals $341_{1-n}$ via the respective optical fibers $180_{1-n}$. The downstream signal $341_j$ is then routed to the optical receiver $195_j$ of the ONU $190_j$ in the same manner as in the LARNET 100 and the LARNET 200.

For upstream traffic, a clocking circuit, not shown, is used to effect temporal control of the transmission of information signals from the broadband source $198_j$ of the ONU $190_j$. The optical transceiver 340 may not be operated to receive and transmit an information signal at a specific optical wavelength at precisely the same instant because the optical amplifier $331_j$ in the transceiver 340 may not be simultaneously forward and reverse biased. The clocking circuit, therefore, must coordinate the transmission of downstream and upstream traffic to prevent the need for simultaneous reception of an upstream information signal at the time of transmission of a downstream information signal, where both the upstream and downstream signals are at the same optical wavelength.

In all other respects, the plurality of upstream information signals $199_{1-n}$ are transmitted from the ONUs $190_{1-n}$ to the RN 160 via optical fibers $180_{1-n}$ in substantially the same manner as in the LARNET 100 and the LARNET 200. The RN 160 multiplexes the plurality of upstream optical signals $199_{1-n}$ and provides a multiplexed output signal at transmission port 161 of the optical demultiplexer 165 for coupling into optical fiber 171 and transmission to the transceiving port 338. As both upstream and downstream traffic is transmitted to and from the transceiver 340, the use of a wavelength selective coupler, such as the coupler 170 in the LARNET 100 and in the LARNET 200 discussed above in connection with FIG. 1 and FIG. 2, respectively, is not applicable in the LARNET 300.

To demultiplex the upstream signals transmitted from the RN 160 via fiber 170, the optical transceiver 340 is operated as an optical receiver. The transceiving port 338 receives upstream information signals $199_{1-n}$ which have been transmitted via fiber 171 from the RN 160. The optical amplifier $333_j$ is reverse biased to detect the upstream optical information signal $199_j$ that flows from transceiving port 338 through the router 135. As indicated above, the time when a reverse bias is applied to the respective optical amplifiers $333_{1-n}$ is synchronized with upstream transmission by the clocking circuit controlling the ONUs $190_{1-n}$. The plurality of reverse biased amplifiers $333_{1-n}$ provide a plurality of electrical signals that is related, respectively, to the plurality of upstream information signals $199_{1-n}$. The plurality of electrical signals are routed from the plurality of amplifiers $333_{1-n}$ through the plurality of electrical lines $361_{1-n}$, respectively, to the plurality of electrical receivers $360_{1-n}$. The physical characteristics of the optical demultiplexer 165 in combination with the transceiver 340 are thus exploited to achieve demultiplexing of optical information signals according to optical wavelength.

Each ONU $190_j$ may be suitably located at any distance away from the central office in the LARNET architectures described according to this invention so long as there is sufficient optical power for detection of the optical information signals transmitted downstream to the optical receiver $195_j$ of an ONU $190_j$ and upstream to the receiver unit in the central office.

It should be noted that the power level of an optical energy signal which must be provided by an optical source in the LARNET 100, the LARNET 200 and the LARNET 300 to facilitate the communication of upstream of downstream traffic, of course, is related to the losses present in the optical network. The coupling of an optical signal provided by the CO 130, the CO 230 or the CO 330, as fabricated preferably on an integrated InP semiconductor chip, into an optical fiber typically results in a coupling loss of 3 dB. The optical demultiplexer 165, fabricated on $SiO_2$ as a waveguide grating router, typically has an insertion loss of 5 dB. Span loss, or the optical power loss between the RN 160 and the coupler 193$_j$ of an ONU 190$_j$, is typically between 3 dB and 5 dB. A wavelength selective coupler, such as the coupler 193$_j$, typically has an insertion loss of 1 dB.

In the downstream direction in the LARNET 100, the LARNET 200 and the LARNET 300, the multi-frequency source 140 and the transceiver 340 typically produce a plurality of −7 dBm optical carriers at the port 138 and the port 338, respectively. Coupling, insertion and span losses decrease the power level of the downstream signals to between −21 dBm and −23 dBm at the output port 192$_j$ of a wavelength selective coupler 193$_j$. It has been experimentally shown, using presently available components, that an optical signal at between −21 dBm and −23 dBm provides a sufficient margin of approximately 20 dB above the minimum signal power required for the reception of a 155 Mb/sec downstream information signal at an optical receiver 195$_j$.

Further, for upstream transmission of information signals, a commercially available LED may be used as the broadband source 198$_j$ to couple −15 dBm of power over a 100 nm bandwidth into a single mode optical fiber. Spectral slicing in the RN 160 decreases by 15 dB the power level of the optical information signals propagating in the channels of the optical demultiplexer 165 which, for example, has 12 routing channels. After accounting for coupling and insertion losses, a −30 dBm optical carrier is present at the input to the SCM or TDM receiver 150 in the LARNET 100, at port 258 of the optical receiver 250 in the LARNET 200 and at the transceiving port 338 in the LARNET 300. It has been experimentally shown that a −30 dBm optical information signal provides a sufficient power margin for upstream traffic at rates of 10 through 100 Mb/s in the LARNET 100, the LARNET 200 and the LARNET 300. Commercially available photoreceivers have typical sensitivities of −42 dBm for data rates of 100 Mb/s, thereby providing an upstream power margin of approximately 12 dB.

It is to be understood that the embodiments and variations shown and described above are illustrative of the principles of this invention only and that various modifications may be implemented by those skilled in the art without departing from the scope and spirit of the invention.

I claim:

1. A system for communicating information signals at optical wavelengths, comprising:

a common unit comprising a single wavelength division multiplexing multi-frequency optical source for providing a plurality of multiplexed discrete optical information signals, wherein said multi-frequency source simultaneously provides a plurality of discrete optical wavelength carriers upon which, respectively, a plurality of information signals is impressed to create the plurality of optical information signals, said common unit further comprising a coupler for receiving said plurality of optical information signals from said multi-frequency optical source;

a passive optical demultiplexer for wavelength division demultiplexing the plurality of multiplexed optical information signals, wherein said plurality of multiplexed optical information signals provided from the multi-frequency source is coupled through the coupler and into a transmission optical fiber for transmission to the optical demultiplexer, and said plurality of demultiplexed optical information signals is coupled into a plurality of routing optical fibers; and, a plurality of optical network units for receiving said plurality of demultiplexed optical information signals from said plurality of routing optical fibers, wherein said plurality of routing optical fibers routes said plurality of demultiplexed signals from the optical demultiplexer to the plurality of optical network units configured, respectively, to receive the plurality of optical information signals at a plurality of discrete optical wavelengths corresponding to the wavelengths of the plurality of optical carriers.

2. The system of claim 1, wherein the multi-frequency source is a waveguide grating laser.

3. The system of claim 1, wherein the optical demultiplexer is a waveguide grating router.

4. The system of claim 3, wherein the router is fabricated on silicon dioxide.

5. The system of claim 1, wherein direct modulation is utilized to impress the plurality of information signals upon the plurality of optical carriers provided by the multi-frequency source.

6. The system of claim 1, wherein external modulation is utilized to impress the plurality of information signals upon the plurality of optical carriers provided by the multi-frequency source.

7. A system for communicating information signals at optical wavelengths, comprising:

a plurality of broadband incoherent sources for providing a plurality of discrete optical information signals, wherein the plurality of broadband sources provide a plurality of discrete optical wavelength carriers upon which, respectively, a plurality of information signals is impressed to create the plurality of optical information signals, and said plurality of optical information signals is coupled from said plurality of broadband sources into a plurality of routing optical fibers;

a passive optical demultiplexer for wavelength division multiplexing said plurality of optical information signals, wherein said plurality of routing optical fibers couples to the optical demultiplexer said plurality of optical information signals provided, respectively, by the plurality of broadband sources, and said plurality of multiplexed optical information signals is coupled from the optical demultiplexer into a transmission optical fiber; and, a common unit comprising a coupler for receiving said plurality of multiplexed optical information signals from the transmission fiber, said common unit further comprising a single multi-frequency optical source for simultaneously demultiplexing said plurality of multiplexed information signals routed to the multi-frequency source from the coupler via the transmission optical fiber.

8. The system of claim 7, wherein the multi-frequency source is a waveguide grating laser.

9. The system of claim 7, wherein the broadband source is a light emitting diode (LED).

10. The system of claim 9, wherein the multi-frequency source is a waveguide grating laser.

11. The system of claim 10, wherein direct modulation is utilized to impress the plurality of information signals upon the plurality of optical carriers provided by the LEDs.

12. The system of claim 10, wherein external modulation is utilized to impress the plurality of information signals upon the plurality of optical carriers provided by the LEDs.

13. A system for communicating information signals at optical wavelengths, comprising:

a central office comprising a single wavelength division multiplexing multi-frequency optical source, a first wavelength selective coupler and a first optical receiver, said multi-frequency source providing a plurality of multiplexed discrete downstream optical information signals which is routed by the first wavelength selective coupler to a transmission optical fiber, wherein said multi-frequency source simultaneously provides a plurality of discrete optical wavelength carriers upon which, respectively, a plurality of downstream information signals is impressed to create the plurality of downstream optical information signals;

a plurality of routing optical fibers;

a plurality of optical network units comprising, respectively, a plurality of second optical receivers, a plurality of broadband incoherent sources and a plurality of second wavelength selective couplers, said plurality of broadband sources providing a plurality of discrete optical wavelength carriers upon which, respectively, a plurality of upstream information signals is impressed to create a plurality of discrete upstream optical information signals, wherein said plurality of upstream optical information signals is routed, respectively, through the plurality of second wavelength selective couplers and coupled, respectively, into the plurality of routing optical fibers; and, a remote node comprising a passive optical demultiplexer, wherein the optical demultiplexer wavelength division multiplexes the plurality of upstream optical information signals coupled into the plurality of routing fibers from the plurality of second wavelength selective couplers and provides the plurality of multiplexed upstream optical information signals for transmission to the first wavelength selective coupler via the transmission optical fiber, said first optical receiver demultiplexing the plurality of multiplexed upstream optical information signals routed to the first receiver by the first wavelength selective coupler, and wherein the optical demultiplexer wavelength division demultiplexes the plurality of downstream multiplexed optical information signals received from the first wavelength selective coupler via the transmission optical fiber and routes said demultiplexed signals, respectively, through the plurality of second wavelength selective couplers to the plurality of second optical receivers of the plurality of optical network units respectively configured to receive the plurality of downstream optical information signals at a plurality of discrete optical wavelengths corresponding to the wavelengths of the plurality of optical carriers.

14. The system of claim 13, wherein the receiver is a wavelength division demultiplexing receiver.

15. The system of claim 14, wherein the wavelength division demultiplexing receiver is a waveguide grating laser.

16. The system of claim 14, wherein the wavelength division multiplexing source and the wavelength division demultiplexing receiver are integrated on an indium phosphate semiconductor chip.

17. The system of claim 13, wherein the broadband source is a light emitting diode (LED).

18. The system of claim 17, wherein the receiver is a subcarrier demultiplexing receiver and the plurality of upstream information signals is subcarrier multiplexed upon the plurality of optical carriers provided by the plurality of LEDs.

19. The system of claim 17, wherein the receiver is a time division demultiplexing receiver and the plurality of upstream information signals is time division multiplexed upon the plurality of optical carriers provided by the plurality of LEDs.

20. The system of claim 17, wherein direct modulation is utilized to impress the plurality of upstream and downstream information signals upon the plurality of optical carriers provided by, respectively, the plurality of LEDs and the multi-frequency source.

21. The system of claim 17, wherein external modulation is utilized to impress the plurality of upstream and downstream information signals upon the plurality of optical carriers provided by, respectively, the plurality of LEDs and the multi-frequency source.

22. The system of claim 13, wherein the optical demultiplexer is a waveguide grating router.

23. The system of claim 22, wherein the router is fabricated on silicon dioxide.

24. A system for communicating information signals at optical wavelengths, comprising:

a single wavelength division multi-frequency transceiver for providing a multiplexed plurality of discrete downstream optical information signals for coupling into a transmission optical fiber, wherein said transceiver simultaneously provides a plurality of discrete optical wavelength carriers upon which, respectively, a plurality of downstream information signals is impressed to create the plurality of downstream optical information signals;

a plurality of routing optical fibers;

a plurality of optical network units comprising, respectively, a plurality of broadband incoherent sources, a plurality of optical receivers and a plurality of wavelength selective couplers, said plurality of broadband sources providing a plurality of discrete optical wavelength carriers upon which, respectively, a plurality of upstream information signals is impressed to create a plurality of discrete upstream optical information signals, wherein said plurality of upstream optical information signals is routed, respectively, through the plurality of wavelength selective couplers and coupled, respectively, into the plurality of routing optical fibers, and wherein said plurality of optical receivers is configured to receive, respectively, a plurality of downstream optical information signals from the plurality of wavelength selective couplers at a plurality of discrete optical wavelengths corresponding to the wavelengths of the plurality of downstream optical carriers; and a passive optical demultiplexer, wherein said optical demultiplexer wavelength division demultiplexes the plurality of downstream optical information signals coupled into the transmission optical fiber at the multi-frequency source, such that said plurality of demultiplexed downstream optical information signals is routed to the plurality of optical receivers according to optical wavelength, wherein said optical demultiplexer wavelength division multiplexes the plurality of upstream information signals coupled from the plurality of wavelength selective couplers into the plurality of routing fibers to provide a plurality of multiplexed upstream optical information signals for transmission to the transceiver via the transmission optical fiber, and wherein the transceiver simultaneously demultiplexes the plurality of multiplexed upstream optical information signals transmitted to the transceiver from the optical demultiplexer via the transmission optical fiber.

25. The system of claim 24, wherein the wavelength division transceiver is a waveguide grating laser.

26. The system of claim 25, wherein the broadband source is a light emitting diode (LED).

27. The system of claim 26, wherein direct modulation is utilized to impress the plurality of upstream and downstream information signals upon the plurality of optical carriers provided by, respectively, the plurality of LEDs and the multi-frequency source.

28. The system of claim 26, wherein external modulation is utilized to impress the plurality of upstream and downstream information signals upon the plurality of optical carriers provided by, respectively, the plurality of LEDs and the multi-frequency source.

29. The system of claim 24, wherein the wavelength division transceiver is integrated on a semiconductor chip.

30. The system of claim 29, wherein the semiconductor chip is fabricated on indium phosphate.

31. The system of claim 24, wherein the broadband source is a light emitting diode (LED).

32. The system of claim 24, wherein the optical demultiplexer is a waveguide grating router.

33. The system of claim 32, wherein the router is fabricated on silicon dioxide.

34. A method of communicating information signals at optical wavelengths comprising the steps of:

biasing a single wavelength division multiplexed multi-frequency optical source to provide a plurality of discrete multiplexed optical information signals, wherein said multi-frequency source simultaneously provides a plurality of discrete optical wavelength carriers upon which, respectively, a plurality of information signals is impressed to create the plurality of optical information signals;

coupling the multiplexed plurality of optical information signals provided by the multi-frequency source into a coupler for routing through a transmission optical fiber and into a passive optical demultiplexer, said optical demultiplexer demultiplexing said multiplexed plurality of optical information signals according to optical wavelength; and, routing said plurality of demultiplexed optical information signals via a respective plurality of routing optical fibers to a respective plurality of optical network units, wherein the wavelengths at which the plurality of demultiplexed optical information signals are received by the plurality of optical network units correspond, respectively, to the wavelengths of the plurality of optical carriers.

35. The method of claim 34, wherein the multi-frequency source is a waveguide grating laser.

36. The method of claim 34, wherein the optical demultiplexer is a waveguide grating router.

37. The method of claim 36, wherein the router is fabricated on silicon dioxide.

38. The method of claim 34, wherein direct modulation is utilized to impress the plurality of information signals upon the plurality of optical carriers provided by the multi-frequency source.

39. The method of claim 34, wherein external modulation is utilized to impress the plurality of information signals upon the plurality of optical carriers provided by the multi-frequency source.

40. A method of communicating information signals at optical wavelengths, comprising the steps of:

biasing a plurality of broadband incoherent sources to provide a plurality of discrete optical information signals, wherein the plurality of broadband sources provide a plurality of discrete optical carriers upon which, respectively, a plurality of information signals is impressed to create the plurality of optical information signals, and wherein said plurality of optical information signals is coupled, respectively, from said plurality of broadband sources into a plurality of routing optical fibers;

routing the plurality of optical information signals from the plurality of broadband sources, respectively, via the plurality of routing optical fibers to a passive optical demultiplexer, wherein said optical demultiplexer multiplexes said plurality of optical information signals; and, coupling the plurality of multiplexed information signals from the optical demultiplexer into a coupler for routing into a transmission optical fiber and then to a single multi-frequency source, said multi-frequency source simultaneously demultiplexing said plurality of multiplexed information signals.

41. The method of claim 40, wherein the multi-frequency source is a waveguide grating laser.

42. The method of claim 40, wherein the broadband source is a light emitting diode (LED).

43. The method of claim 42, wherein the multi-frequency source is a waveguide grating laser.

44. The method of claim 42, wherein direct modulation is utilized to impress the plurality of information signals upon the plurality of optical carriers provided by the LEDs.

45. The method of claim 42, wherein external modulation is utilized to impress the plurality of information signals upon the plurality of optical carriers provided by the LEDs.

46. The method of claim 42, wherein the optical demultiplexer is a waveguide grating router, said router being fabricated on silicon dioxide.

* * * * *